(12) United States Patent
Miller et al.

(10) Patent No.: US 7,503,760 B2
(45) Date of Patent: Mar. 17, 2009

(54) METHOD AND APPARATUS FOR BLOW MOLDING

(75) Inventors: Paul Alan Miller, Cement City, MI (US); Allyn K. Ham, Clayton, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 817 days.

(21) Appl. No.: 11/050,492

(22) Filed: Feb. 2, 2005

(65) Prior Publication Data

US 2006/0170138 A1  Aug. 3, 2006

(51) Int. Cl.
  *B29C 49/64* (2006.01)
(52) U.S. Cl. .......................... 425/526; 249/79
(58) Field of Classification Search ................ 425/526; 249/79
See application file for complete search history.

(56) References Cited

U.S. PATENT DOCUMENTS

| | | | | |
|---|---|---|---|---|
| 3,354,509 | A | * | 11/1967 | Ammondson ............... 425/195 |
| 3,843,286 | A | * | 10/1974 | Horberg et al. ............ 425/526 |
| 5,255,889 | A | | 10/1993 | Collette et al. |
| 5,522,448 | A | * | 6/1996 | Righi ......................... 164/122 |
| 5,762,981 | A | | 6/1998 | Nitsche |
| 6,428,302 | B1 | | 8/2002 | Tsau |

FOREIGN PATENT DOCUMENTS

DE  19925756 A1 * 12/2000

* cited by examiner

*Primary Examiner*—Robert B Davis
(74) *Attorney, Agent, or Firm*—John W. Gregg

(57) ABSTRACT

A mold for blow molding has a base component for forming at least one portion of a concave base of a container and comprising a mounting plate having connections for supply and return of a heat transfer fluid, a body having a molding surface thereon and having a substantially cylindrical recess having a roof spaced from the molding surface, a substantially cylindrical insert comprising a diverting surface, an inlet passage therethrough and open to the diverting surface and an outlet passage therethrough, the diverting surface spaced from the roof and side of the recess so as to define a cavity and a drain therefrom open to the outlet passage. In a method of blow molding turbulent flow is induced in heat transfer fluid conducted through the base component from impact with the roof and the turbulent flow is dispersed within the cavity over the diverting surface whereby heat transfer from the molding surface is enhanced.

4 Claims, 2 Drawing Sheets

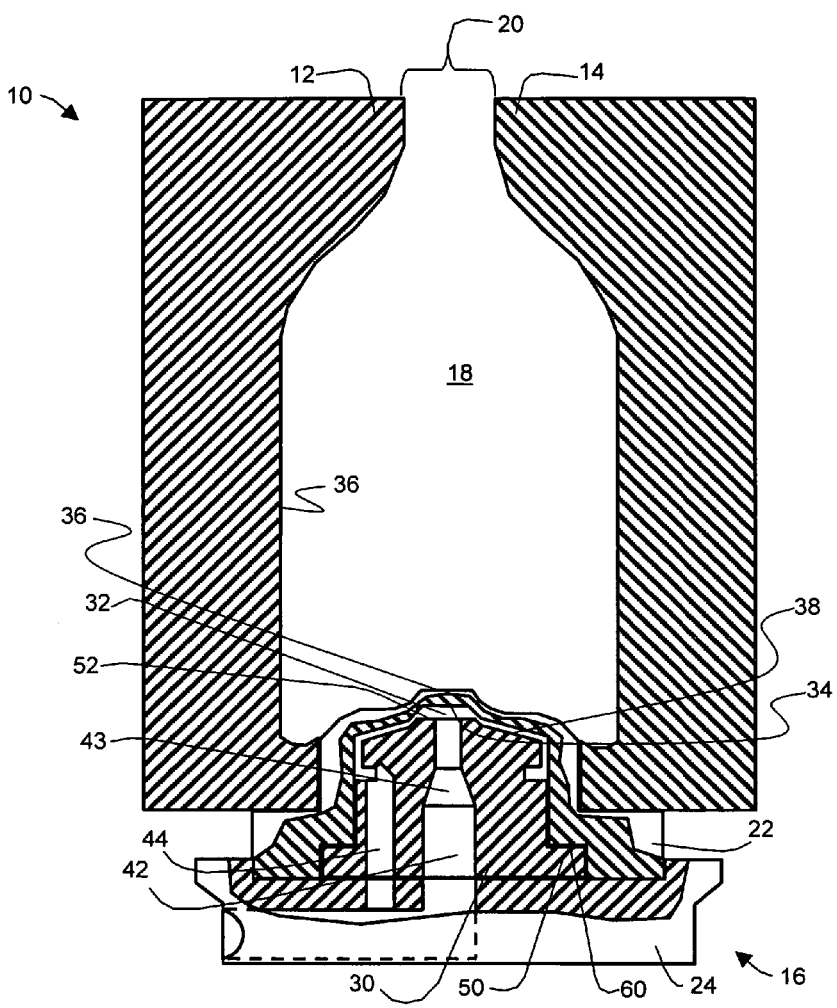
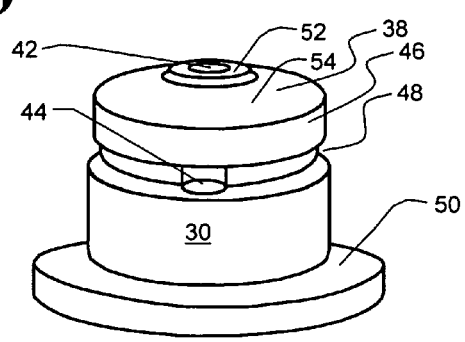

METHOD AND APPARATUS FOR BLOW MOLDING

I. BACKGROUND OF THE INVENTION

1. Field of the Invention

This invention relates generally to blow molding. In particular, this invention relates to apparatus and methods for heat transfer in mold components for blow molding.

2. Description of Related Art

Molds for blow molding articles having bases including concave portions are known wherein the molds comprise left and right mold halves and a base component. Further, it is known to provide passages within the mold members for conduction of heat transfer fluid to enhance temperature conditioning of the material from which the articles are formed. In this regard, it is known to use heat transfer fluid to remove heat from the material after expansion to the shape of the mold cavity to reduce the time required for the expanded article to become sufficiently solid for removal from the mold without unacceptable deformation. As a consequence of the required projection of the base component to form the concave portion of the molded article, the base component has a relatively large thermal mass. However, it is common that the molding surface of the base component includes features defining localized variations in depth of the projection. To effectively transfer heat from the base molding surfaces, it is known to provide a central cavity in the mold base component proximate the molding surface and an inlet for heat transfer fluid thereto below the roof of the cavity. Depending on the location of the outlet, such arrangements may result in relatively little turbulence of the heat transfer fluid within the cavity, reducing the effectiveness of heat transfer from the molding surfaces. Hence, there is a continuing need for providing improved heat transfer effectiveness for blow molding articles having concave bases.

II. SUMMARY OF THE INVENTION

It is an object of the present invention to provide a mold for blow molding an article having a concave base wherein a base component of the mold comprises a molding surface and means for dispersing turbulent flow in a heat transfer fluid conducted through the base component so as to enhance heat transfer from the molding surface.

It is a further object of the present invention to provide a mold for blow molding an article having a concave base wherein a base component of the mold comprises a molding surface and means for accelerating the flow of heat transfer fluid conducted through the base component so as to induce turbulent flow therein to enhance heat transfer from the molding surface.

Further objects and advantages of the invention shall be made apparent from the accompanying drawings and the following description thereof.

In accordance with the aforesaid objects the present invention provides a mold for blow molding having a base component for forming at least one portion of a concave base of a blow molded container, the base component comprising a mounting plate having connections for supply and return of a heat transfer fluid, a body having a molding surface defining the shape of the at least one portion of a concave base of the container and a mounting surface opposite the molding surface and having a substantially cylindrical recess therein and open to the mounting surface and having a roof spaced from the molding surface, a substantially cylindrical insert comprising a diverting surface, an inlet passage therethrough and open to the diverting surface and an outlet passage therethrough, the diverting surface spaced from the roof and side of the recess so as to define a cavity and a drain therefrom open to the outlet passage, whereby heat transfer fluid is admitted to the cavity via the inlet passage and redirected via the roof and diverting surface to the outlet passage. Advantageously, the inlet passage comprises a neck portion wherein the cross sectional area of the passage is reduced between the entry to the inlet passage of the insert and the opening thereof at the diverting surface and the insert further comprises a groove in the side thereof and defining the lower extremity of the diverting surface and wherein the outlet passage is open to the groove whereby heat transfer fluid enters the outlet passage from the groove. A method of blow molding comprises conducting a heat transfer fluid through a mold in accordance with the invention whereby turbulence is induced in the fluid from impact with the roof of the recess and the turbulent flow is dispersed over the diverting surface to enhance heat transfer from the molding surface.

III. BRIEF DESCRIPTION OF THE DRAWINGS

FIG. 1 illustrates a mold in partial cross section and including a base component in accordance with the invention.

FIG. 3 is a three dimensional view of the insert of the mold base component of FIG. 1

IV. DETAILED DESCRIPTION OF THE PREFERRED EMBODIMENT

Figure 2A:
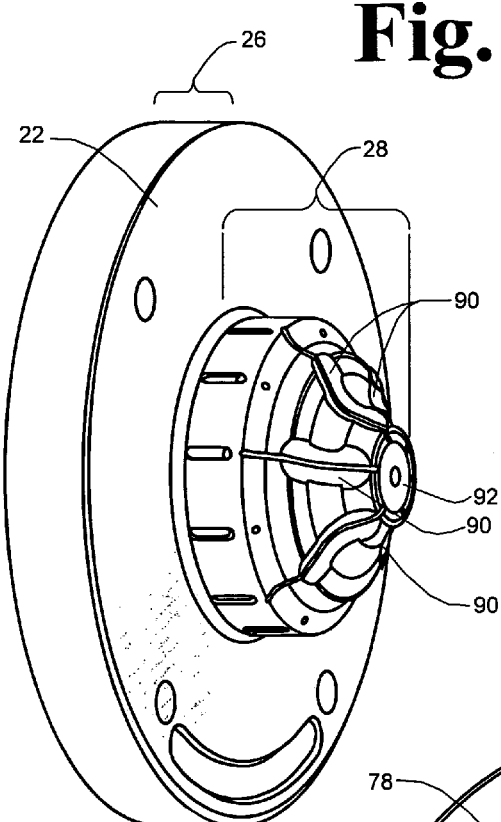
FIGS. 2a and 2b are three dimensional views of the mold base component of FIG. 1

The invention shall be illustrated with reference to a preferred embodiment which shall be described in detail. It is not the intention of applicant that the invention be limited to the preferred embodiment, but rather that the invention shall be defined by the appended claims and all equivalents thereof.

Referring to FIG. 1 mold 10 comprises left mold half 12, right mold half 14 and base component 16. A mold cavity 18 defined by left and right mold halves 12 and 14 and base component 16 establishes the external shape of an article to be molded, advantageously a container. A finished article is produced in mold 10 from a so called "preform" or "parison" which is smaller than the finished article, is open at an end proximate neck portion 20 of mold 10 and is otherwise closed. The preform is retained within mold 10 proximate neck portion 20 and is expanded within mold 10 by introduction into the closed preform of a pressurized fluid, typically compressed air or by a combination of introduction of pressurized fluid and mechanical stretching of the preform longitudinally. As the preform expands, a concave base is formed in the lower end thereof by a molding surface comprising a projection of base component 16 into the interior of cavity 18.

Continuing with reference to FIG. 1, base component 16 is shown with a partial cut-away revealing cross sections of elements thereof. Base component 16 comprises body 22 supported at a mounting surface 88 (FIG. 2b) of body 22 by mounting plate 24 and a projection portion 28 (FIG. 2a) comprising molding surface 36 substantially opposite mounting surface 88. Body 22 comprises flange portion 26 (FIGS. 2a & 2b) seating against left and right mold halves 12 and 14. The molding surface projects into cavity 18 to form at least a portion of the concave base of a container. Molding surface 36 comprises features such as indentations 90 (FIG. 2a) and central plateau 92 that create localized variations of the distance from mounting surface 88 to molding surface 36. Base component 16 comprises means for dispersing turbulent flow of a heat transfer fluid conducted therethrough to improve the effectiveness of heat transfer from molding surface 36.

Referring to FIGS. 1, 2a, 2b and 3, base component 16 comprises an insert 30 fitted within an internal recess 32 within body 22. Recess 32 is substantially cylindrical, open at mounting surface 88 and comprising roof 34 proximate molding surface 36. Advantageously, roof 34 comprises one or more segments arranged to substantially conform in shape and area to corresponding segments of molding surface 36. For example, central dome 62 of roof 34 substantially conforms in shape and area to plateau 92 of molding surface 36 and roof flared surround 64 substantially conforms in shape and area to the contour of molding surface 36 comprising indentations 90. Mounting holes 72-78 are provided in flange portion 26 for fixing body 22 to mounting plate 24 with fasteners (not shown). Insert 30 is substantially cylindrical for fitting within recess 32 and comprises diverting surface 38, inlet passage 42, outlet passage 44, insert flange 50 and groove 48 in insert side 46 (FIG. 3) and defining the lower extremity of diverting surface 38. Inlet passage 42 is open to diverting surface 38 proximate the center thereof. Outlet passage 44 is open to groove 48. Insert flange 50 is seated against shoulder 60 (FIG. 2b) at the open end of recess 32 so that diverting surface 38 is spaced from both roof 34 and recess side 40. Inlet passage 42 and outlet passage 44 mate with passages in mounting plate 24 to which connections are made for supply and return of heat transfer fluid (supply passage shown partially dashed in FIG. 1).

Figure 2B:
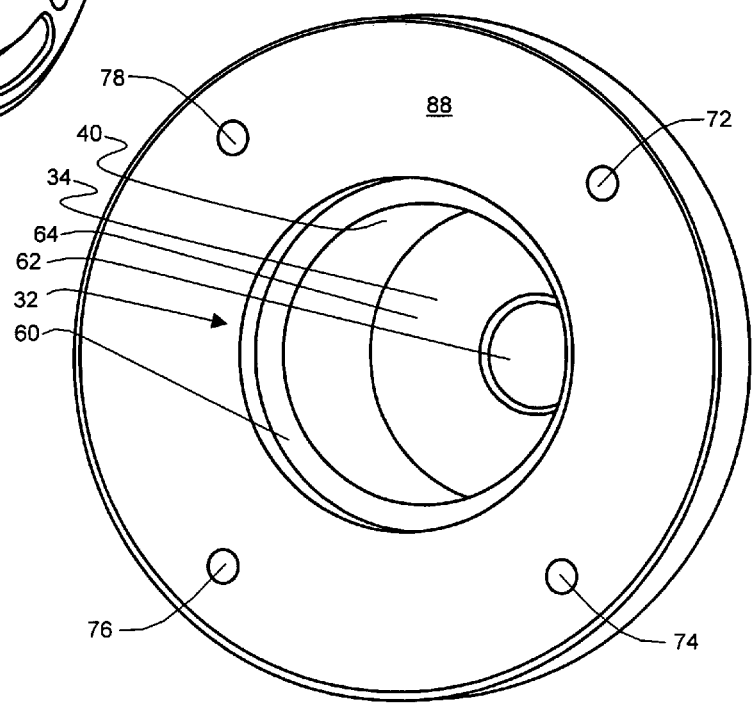

Referring to FIGS. 1, 2a and 2b, advantageously, inlet passage 42 comprises inlet neck portion 43 where the cross sectional area of the inlet passage is reduced to increase velocity of flow of heat transfer fluid exiting inlet passage 42 at diverting surface 38. To further advantage, diverting surface 38 comprises one or more segments substantially conforming in shape and area to corresponding segments of roof 34. For example insert plateau 52 conforms substantially in shape and area to roof central dome 62, and insert flared surround 54 conforms substantially in shape and area to roof flared surround 64. Advantageously, insert plateau 52 is spaced further from dome 62 than insert flared surround 54 is spaced from roof flared surround 64. Roof 34, recess side 40, diverting surface 38 and groove 48 define a cavity and drain therefrom to which heat transfer fluid is admitted via inlet passage 42 and removed via outlet passage 44. Heat transfer fluid exits inlet passage 42 flowing in the direction of recess central dome 62 and is redirected by impact with recess central dome 62 toward insert plateau 52. Fluid is dispersed toward recess side 40 within the gap between insert flared surround 54 and roof flared surround 64. At the periphery of insert flared surround 54, fluid flows into groove 48 and therefrom through the opening of outlet passage 44 therein. Turbulence is induced in the fluid from impact with central dome 62 and the acceleration of fluid passing through inlet neck portion 43, tending to increase the dispersion of turbulent flow within the gap between insert flared surround 54 and roof flared surround 64 away from inlet passage 42. With the cavity defined by roof 34, diverting surface 38 and recess side 40 filled with heat transfer fluid, heat transfer fluid contacts the substantial entirety of the area of roof 34 before exiting through outlet passage 44, thereby enhancing the effectiveness of heat transfer from the molding surfaces comprising base component 16.

While the preferred embodiment has been shown and described in detail, it is not the intention of applicant that the invention be limited to the preferred embodiment or such detail. Rather, it is intended that the invention be defined by the appended claims and equivalents thereof.

What is claimed is:

1. A mold for blow molding having a base component for forming at least one portion of a concave base of a blow molded container, the base component comprising a mounting plate having connections for supply and return of a heat transfer fluid, a body having a molding surface defining the shape of the at least one portion of a concave base of the container, a mounting surface opposite the molding surface, a substantially cylindrical recess open to the mounting surface and having a roof spaced from the molding surface and comprising a central dome joined with a recess flared surround and a substantially cylindrical insert having a diverting surface comprising an insert plateau joining an insert flared surround, an inlet passage through the insert and open at the insert plateau and an outlet passage through the insert, the diverting surface spaced from the roof and side of the recess so as to define a cavity and a drain therefrom open to the outlet passage, the roof and diverting surface dispersing turbulent flow of a heat transfer fluid conducted through the base component to improve the effectiveness of heat transfer from the molding surface.

2. The mold according to claim 1 wherein the inlet passage comprises an inlet neck portion wherein the cross sectional area of the passage is reduced between the entry to the inlet passage of the insert and the opening thereof at the diverting surface to increase velocity of heat transfer fluid exiting the inlet passage in the direction of the dome.

3. The mold according to claim 1 wherein the insert further comprises a groove in the side thereof and defining the lower extremity of the diverting surface and wherein the outlet passage is open to the groove whereby heat transfer fluid enters the outlet passage from the groove.

4. The mold according to claim 1 wherein the insert plateau is being spaced further from the dome than the insert flared surround is from the roof flared surround.

* * * * *